(12) United States Patent
Hubscher et al.

(10) Patent No.: US 7,766,094 B2
(45) Date of Patent: Aug. 3, 2010

(54) HITCH ATTACHMENT FOR MOUNTING OF AN ACCESSORY OF AN ATV

(75) Inventors: Darin Hubscher, Swan River (CA); Jon Close, Elie (CA); Lyle Dueck, Oakville (CA)

(73) Assignee: Quadivator Inc., Portage-la-Prairie, Manitoba (CA)

( * ) Notice: Subject to any disclaimer, the term of this patent is extended or adjusted under 35 U.S.C. 154(b) by 541 days.

(21) Appl. No.: 11/478,359

(22) Filed: Jun. 30, 2006

(65) Prior Publication Data

US 2008/0006416 A1    Jan. 10, 2008

(51) Int. Cl.
*A01B 51/00*    (2006.01)

(52) U.S. Cl. .................. 172/272; 172/677; 172/439; 280/417.1

(58) Field of Classification Search ......... 172/240–244, 172/272, 452, 677, 773, 776, 453, 439, 440, 172/441, 442, 448, 679, 817; 280/417.1, 280/476.1; 180/908
See application file for complete search history.

(56) References Cited

U.S. PATENT DOCUMENTS

| | | | | |
|---|---|---|---|---|
| 2,691,930 | A * | 10/1954 | Forgy | 172/328 |
| 2,848,252 | A * | 8/1958 | Martin | 280/417.1 |
| 4,762,182 | A * | 8/1988 | Reimann | 172/327 |
| 5,746,275 | A | 5/1998 | Cross et al. | |
| 5,988,294 | A | 11/1999 | Hubscher | |
| 6,257,347 | B1 * | 7/2001 | Campisi | 172/439 |
| 6,461,095 | B1 * | 10/2002 | Puska | 414/462 |
| 6,577,330 | B1 | 6/2003 | Tsuda et al. | |
| 6,796,384 | B1 * | 9/2004 | Potter | 172/439 |
| 7,100,704 | B2 * | 9/2006 | Potter | 172/439 |
| 2002/0043193 | A1 * | 4/2002 | Burley | 111/52 |
| 2005/0109424 | A1 * | 5/2005 | Leseberg | 144/34.5 |
| 2006/0086008 | A1 | 4/2006 | Hubscher et al. | |

FOREIGN PATENT DOCUMENTS

WO    WO 02/26023    4/2002

OTHER PUBLICATIONS

Kolpin brochure (2 pages).

* cited by examiner

*Primary Examiner*—Robert E Pezzuto
*Assistant Examiner*—Matthew D Troutman
(74) *Attorney, Agent, or Firm*—Adrian D. Battison; Ade & Company Inc.

(57) ABSTRACT

An ATV hitch attachment includes a first mounting point defined by a hitch coupling and two further mounting points defined by two brace arms inclined upwardly and outwardly to a respective connection location on the rear rack. A rigid connecting member has a pair of arms extending rearwardly for rigid connection by a sliding fit to a forward end of a pair of parallel frame members of an implement such that the rigid connection holds the implement in the operating position in a common horizontal plane with the arms. The implement can be lifted to a raised transport position by an electric actuator causing pivotal movement about a horizontal pivot axis transverse to the rear hitch. Ground wheels which are spaced from the ground in operating position which can contact the ground when the implement is raised to limit squatting movement of the ATV.

9 Claims, 4 Drawing Sheets

US 7,766,094 B2

HITCH ATTACHMENT FOR MOUNTING OF AN ACCESSORY OF AN ATV

This invention relates to hitch attachment for mounting an accessory on an ATV.

BACKGROUND OF THE INVENTION

Many different arrangements have been provided for attachment of accessories to an ATV type vehicle since such vehicles provide a convenient power plant for moving various accessories and avoid the necessity for a dedicated machine for each accessory. In recent years ATV type vehicles have achieved considerable market penetration and have dramatically improved in construction and features.

A number of examples of such mounting arrangements are shown in the following U.S. patents:

U.S. Pat. No. 6,577,330 of the present inventor issued May 6, 2003 discloses a mower located underneath the vehicle which is supported at the rear end on the hitch at which there is provided an engine for driving the mower and carried at the forward end underneath the vehicle on wheels and is prevented from side to side movement by chains attached to the vehicle frame at a suitable location above the mower. The disclosure of this patent is incorporated herein by reference for any additional details of a machine of this type which may be omitted herein.

PCT published Application WO 02/26023 (De Thomasis) published Apr. 4, 2002 discloses a similar and related arrangement of a mower located underneath the vehicle with an engine for driving the mower at the rear and carried at the forward end underneath the vehicle on wheels and is prevented from side to side movement by straps attached to the vehicle frame at a suitable location above the mower. In this arrangement the rear end is not supported by the hitch but is instead carried on wheels. The disclosure of this patent is incorporated herein by reference for any additional details of a machine of this type which may be omitted herein.

The present inventor in a U.S. application filed Oct. 21, 2004, Ser. No. 10/969,237 which corresponds to a Canadian application, filed Oct. 20, 2004, Serial No: 2,485,392, discloses a mounting for an accessory to be carried in front of the ATV such as a blade or snow blower where a hitch is connected at the rear to the hitch of the vehicle and a frame extends forwardly underneath the vehicle which is then clamped up underneath the vehicle to provide a stable mount for the accessory.

In U.S. Pat. No. 5,988,294 issued Nov. 23, 1999, the present inventor discloses a trailer which is trailed behind and ATV and can be configured to carry different implements such as a cultivator, blade or disker. As the trailer is merely trailed behind from the hitch of the ATV, there is no ability for the trailer to be lifted to a transport position and no ability for weight to be transferred to the accessory from the ATV to increase penetration into the ground. Also the accessory is less stable and less effectively controlled as it is merely trailed.

In U.S. Pat. No. 5,746,275 (Cross) assigned to Cycle Country Accessories Corp and issued May 5, 1998 is disclosed a three-point hitch construction which attaches the accessory or implement more effectively to the rear of the ATV using arms which allow it to be supported at a required height and to be adjusted to raise and lower the implement. Further system described may allow floating movement and may allow transfer of weight from the ATV to the implement. A key point mentioned is that the system allows the rear suspension of the ATV to be locked out at a fixed height to maintain the implement at the fixed height.

In a brochure describing a three-point hitch Kolpin shows a device which attaches simply to the regular hitch coupling of an ATV and provides a pair of arms and a center link similar in construction and operation to a conventional three point hitch of the type carried on a tractor.

SUMMARY OF THE INVENTION

It is one object of the invention to provide an accessory for mounting on an ATV which allows possible advantages in mounting and operation.

According to one aspect of the invention there is provided a hitch attachment for connecting an implement to an ATV wherein the ATV comprises a frame mounted on ground wheels, a drive system for driving the ATV, a rear hitch attached to the frame and a rear rack attached to the frame, the hitch attachment comprising:

an attachment frame;

a hitch coupling mounted on the attachment frame and arranged to be rigidly connected to the rear hitch such that the attachment frame is carried rearwardly of the rear hitch;

two brace arms each connected to the attachment frame on a respective side thereof and each arranged to extend upwardly from the attachment frame to a respective connection location on the rear rack and each including a coupling member for connection at the connection location;

a rigid connecting member having couplings thereon for rigid connection to a forward end of an implement such that the rigid connecting member remains at a fixed orientation to the implement;

a pivot mounting for mounting the rigid connection member on the attachment frame for pivotal movement about a horizontal pivot axis transverse to the rear hitch;

and an actuator for effecting pivotal movement of the rigid connecting member about the pivot axis between an operating position in which the rigid connecting member holds the implement in fixed operating position extending rearwardly from the rear hitch and a transport position in which the rigid connecting member is rotated around the pivot axis to rotate the implement around the pivot axis to a raised transport position.

Preferably the brace arms are mounted on the attachment frame so as to be inclined upwardly and outwardly toward the rear rack to assist in preventing side to side movement of the attachment frame on the rear hitch. In this way a rigid three point attachment is provided so as to provide sufficient communication of forces between the ATV frame and the implement such that the weight of the ATV and rider can be used to apply ground force to the implement.

Preferably the attachment frame includes a plurality of different connection points thereon for coupling lower ends of each of the brace arms to adjust for different ATV types.

Preferably the rigid connecting member includes a pair of horizontally spaced, rearwardly extending connecting arms, each arranged for rigid connection to a forward end of a respective frame member of an implement so as to hold the frame members of the implement in a common plane with the arms. This provides a simple rigid connection between the implement and the connecting member by which the implement can readily be maintained in the same horizontal plane as the arms.

Preferably the rigid connecting member is connected to the implement only by the two connecting arms, although additional connecting points may be used.

Preferably the connecting arms are connected to the frame members of the implement to hold the implement against side to side movement.

Preferably the connecting arms each comprises a tube having a rear end arranged for sliding fit of end of frame member thereon. The arms may be larger in cross-section so that the frame slides inside or vice-versa.

Preferably the attachment frame includes first adjustment mountings for mounting the pivot mounting of the rigid connecting member by which the height of the pivot axis on the attachment frame can be adjusted and second adjustment mountings for mounting the actuator by which the height of the actuator and the height of the pivot axis on the attachment frame can be adjusted, with the first and second mountings arranged for common height adjustment of the pivot axis and actuator such that, at each position of adjustment, the angle of the rigid connecting member about the pivot axis in the operating position remains the same.

Preferably the angle is arranged such that the angle of the rigid connecting member remains horizontal to retain a frame of the implement horizontal.

Preferably there is no connection of the attachment frame to the ATV suspension and wherein there is provided at least one ground wheel carried on the attachment frame which is arranged to be spaced from the ground in the operating position and arranged such that it can engage the ground to limit squatting of the rear hitch of the ATV when the implement is moved to transport position.

According to a second aspect of the invention there is provided a hitch attachment for connecting an implement to an ATV wherein the ATV comprises a frame mounted on ground wheels, a drive system for driving the ATV, a rear hitch attached to the frame and a rear rack attached to the frame, the hitch attachment comprising:

an attachment frame;

a hitch coupling mounted on the attachment frame and arranged to be rigidly connected to the rear hitch such that the attachment frame is carried rearwardly of the rear hitch;

bracing elements connected to the attachment frame arranged to extend from the attachment frame to the rear rack to provide coupling forces to the rear rack;

a connecting member having couplings thereon for rigid connection to a forward end of an implement;

a pivot mounting for mounting the connecting member on the attachment frame for pivotal movement about a horizontal pivot axis transverse to the rear hitch;

and an actuator for effecting pivotal movement of the connecting member about the pivot axis between an operating position in which the connecting member holds the implement in fixed operating position extending rearwardly from the rear hitch and a raised transport position;

wherein the connecting member includes a pair of horizontally spaced, rearwardly extending connecting arms, each arranged for rigid connection to a forward end of a frame member of an implement so as to hold the frame members of the implement in a common plane with the arms.

According to a third aspect of the invention there is provided a hitch attachment for connecting an implement to an ATV wherein the ATV comprises a frame mounted on ground wheels, a drive system for driving the ATV, a rear hitch attached to the frame and a rear rack attached to the frame, the hitch attachment comprising:

an attachment frame;

a hitch coupling mounted on the attachment frame and arranged to be rigidly connected to the rear hitch such that the attachment frame is carried rearwardly of the rear hitch;

bracing elements connected to the attachment frame arranged to extend from the attachment frame to the rear rack to provide coupling forces to the rear rack;

a connecting member having couplings thereon for rigid connection to a forward end of an implement;

a pivot mounting for mounting the connecting member on the attachment frame for pivotal movement about a horizontal pivot axis transverse to the rear hitch;

and an actuator for effecting pivotal movement of the connecting member about the pivot axis between an operating position in which the connecting member holds the implement in fixed operating position extending rearwardly from the rear hitch and a transport position in which the connecting member is rotated around the pivot axis to rotate the implement around the pivot axis to a raised transport position;

wherein the attachment frame includes first adjustment mountings for mounting the pivot mounting of the connecting member by which the height of the pivot axis on the attachment frame can be adjusted and second adjustment mountings for mounting the actuator by which the height of the actuator and the height of the pivot axis on the attachment frame can be commonly adjusted such that at each position of adjustment the angle of the connecting member about the pivot axis in the operating position remains the same.

According to a fourth aspect of the invention there is provided a hitch attachment for connecting an implement to an ATV wherein the ATV comprises a frame mounted on ground wheels, a drive system for driving the ATV, a rear hitch attached to the frame and a rear rack attached to the frame, the hitch attachment comprising:

an attachment frame;

a hitch coupling mounted on the attachment frame and arranged to be rigidly connected to the rear hitch such that the attachment frame is carried rearwardly of the rear hitch;

bracing elements connected to the attachment frame arranged to extend from the attachment frame to the rear rack to provide coupling forces to the rear rack;

a connecting member having couplings thereon for rigid connection to a forward end of an implement;

a pivot mounting for mounting the connecting member on the attachment frame for pivotal movement about a horizontal pivot axis transverse to the rear hitch;

and an actuator for effecting pivotal movement of the connecting member about the pivot axis between an operating position in which the connecting member holds the implement in fixed operating position extending rearwardly from the rear hitch and a raised transport position;

wherein there is no connection of the attachment frame to the ATV suspension and wherein there is provided at least one ground wheel carried on the attachment frame which is arranged to be spaced from the ground in the operating position and arranged such that it can engage the ground to limit squatting of the rear hitch of the ATV when the implement is moved to transport position.

According to a further aspect of the invention there is provided combination comprising an ATV having a frame mounted on ground wheels, a drive system for driving the ATV, a rear hitch attached to the frame and a rear rack attached to the frame; an implement for attachment to the ATV; and a hitch attachment as defined above.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
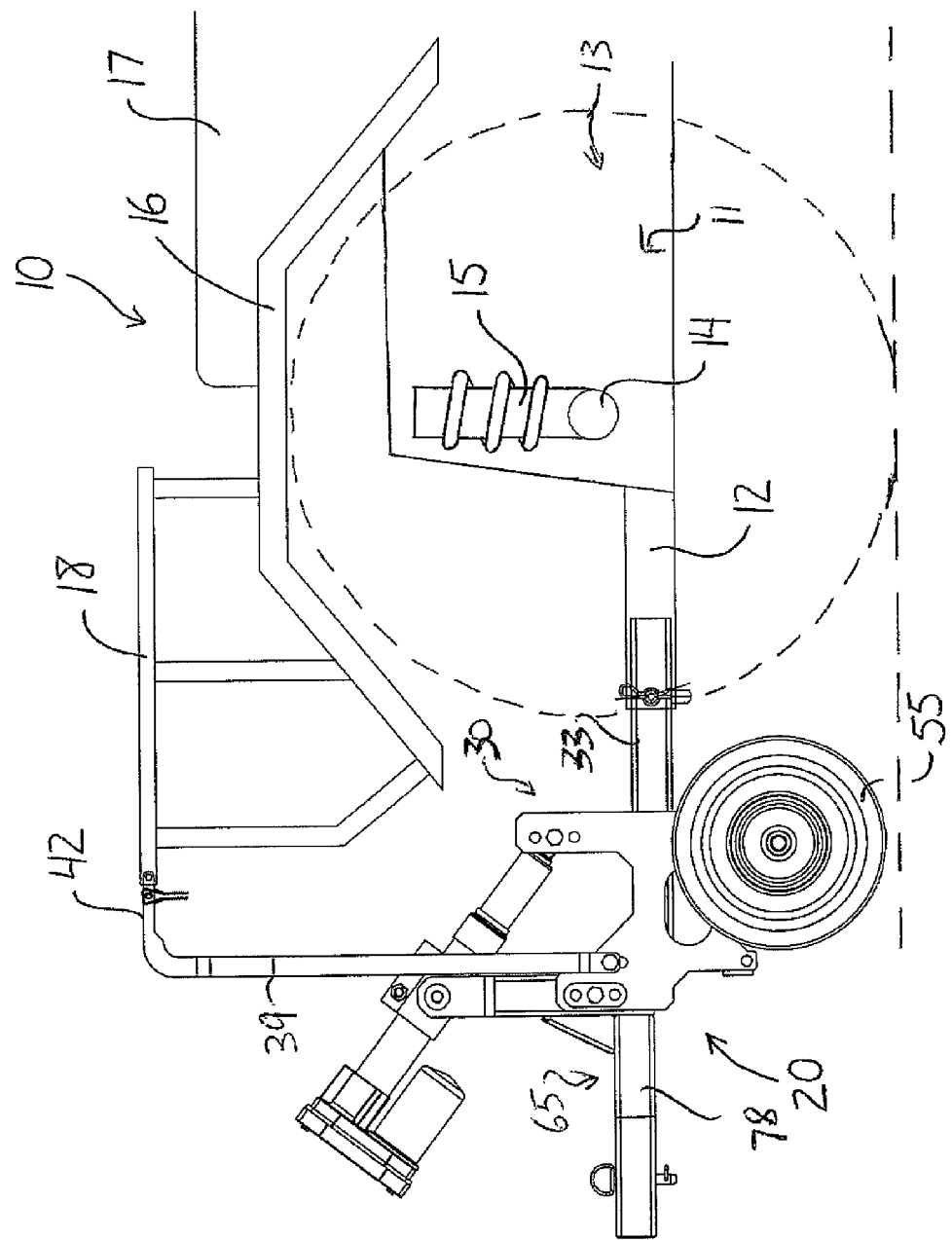
FIG. 1 is a side elevational view partly schematic of the rear part of a conventional ATV to which is attached a hitch attachment according to the present invention.

A conventional ATV is shown only schematically in FIG. 1 and indicated at 10. Such ATV's or all terrain vehicles are of course well known and widely used and are manufactured by different manufacturers which have slightly different characteristics and constructions. The ATV comprises a frame schematically indicated at 11 which attaches to a rear hitch coupling 12 at the rear end for conventional attachment of equipment to be trailed. The vehicle includes a pair of rear wheels 13 carried on a rear axle 14 suspended from the frame 11 by a suspension system 15. On the frame is carried a pair of rear fenders 16 and a saddle 17 on which the rider sits. A rack 18 is mounted on the structure at the rear behind the saddle and over the rear fenders 16.

Further details of a vehicle of this type can be found from many different publications showing the constructions of different manufacturers and are well known to a person skilled in the art.

Figure 4:
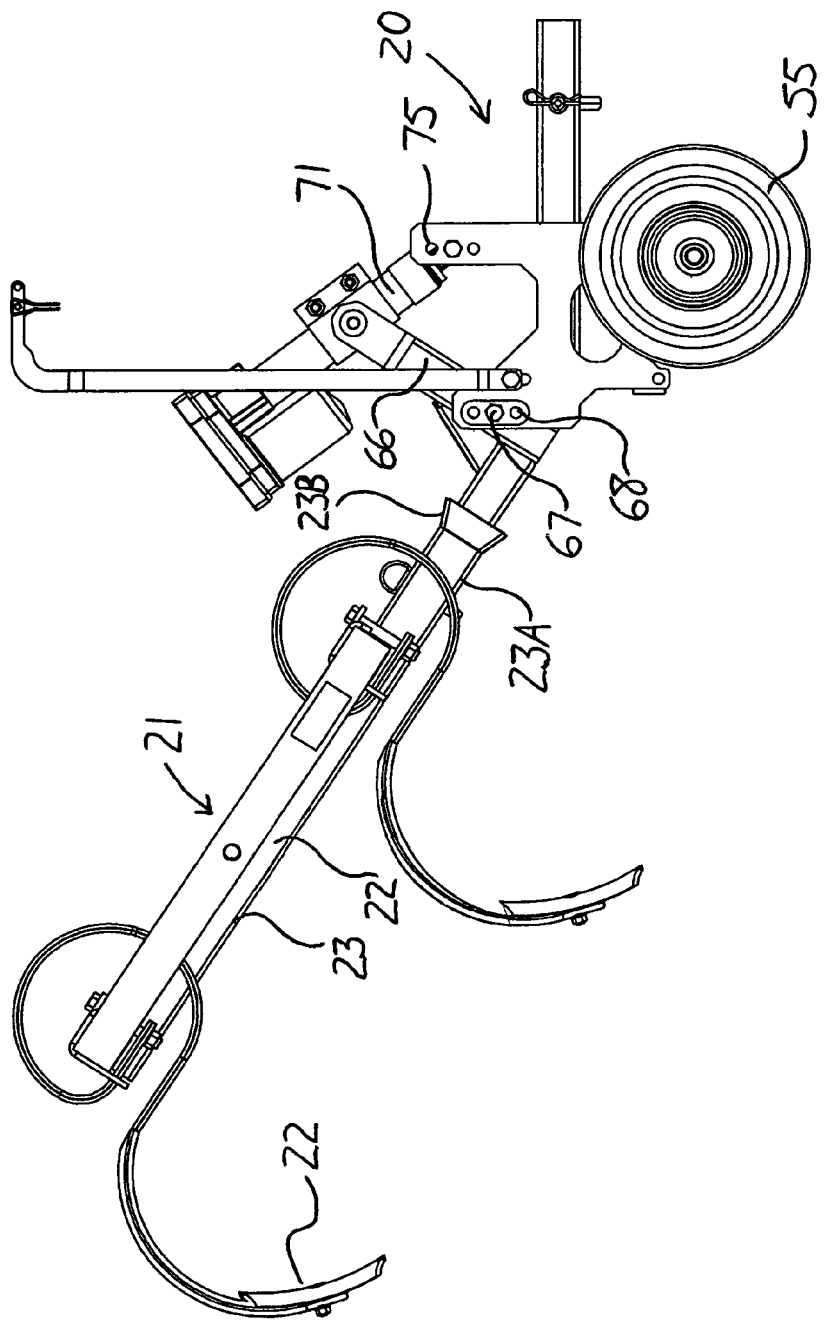
FIG. 4 is a side elevational view similar to that of FIG. 2 with an implement attached to the hitch attachment and with the implement in a raised transport position.

The present invention is particularly concerned with a hitch attachment generally indicated at 20 which is arranged for attachment to an implement 21 as shown in FIG. 4. The implement 21 can be of many different types. In the example shown the implement 21 is a cultivator with a plurality of cultivator shanks 22. However similar implements can be manufactured using the principles described herein. For example similar arrangements can carry two rows of discs, a blade, a sweeping arrangement, a harrow frame or other devices to a person well known to a person skilled in this art. In all cases, however, the implement includes a frame generally indicated at 22 in the form of a pair of forwardly extending beams 23 and suitable connecting cross members. The frame is intended in the operating position to be located in a horizontal position which is adjusted relative to the vehicle so that, in the horizontal position of the frame, the implements engage the ground at a required level depending upon the operation of the implements. Thus for example in the cultivator as shown in the operating position the height of the frame is arranged so that the cultivator shanks and the cultivator tools carried at the lower end of the shanks are arranged so that they penetrate the ground in a cultivating action.

Figure 2:
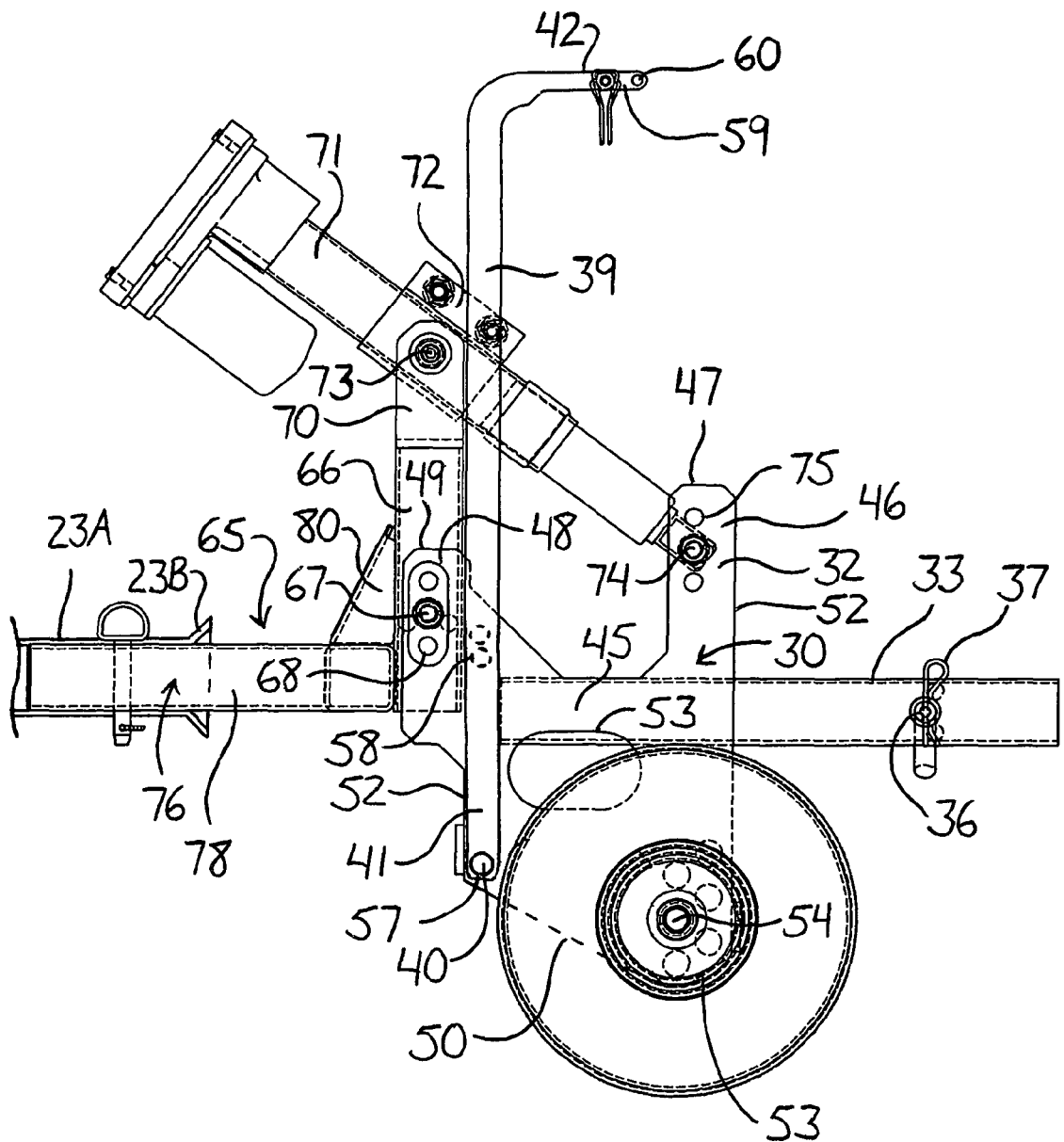
FIG. 2 is a side elevational view of the hitch attachment alone.
Figure 3:
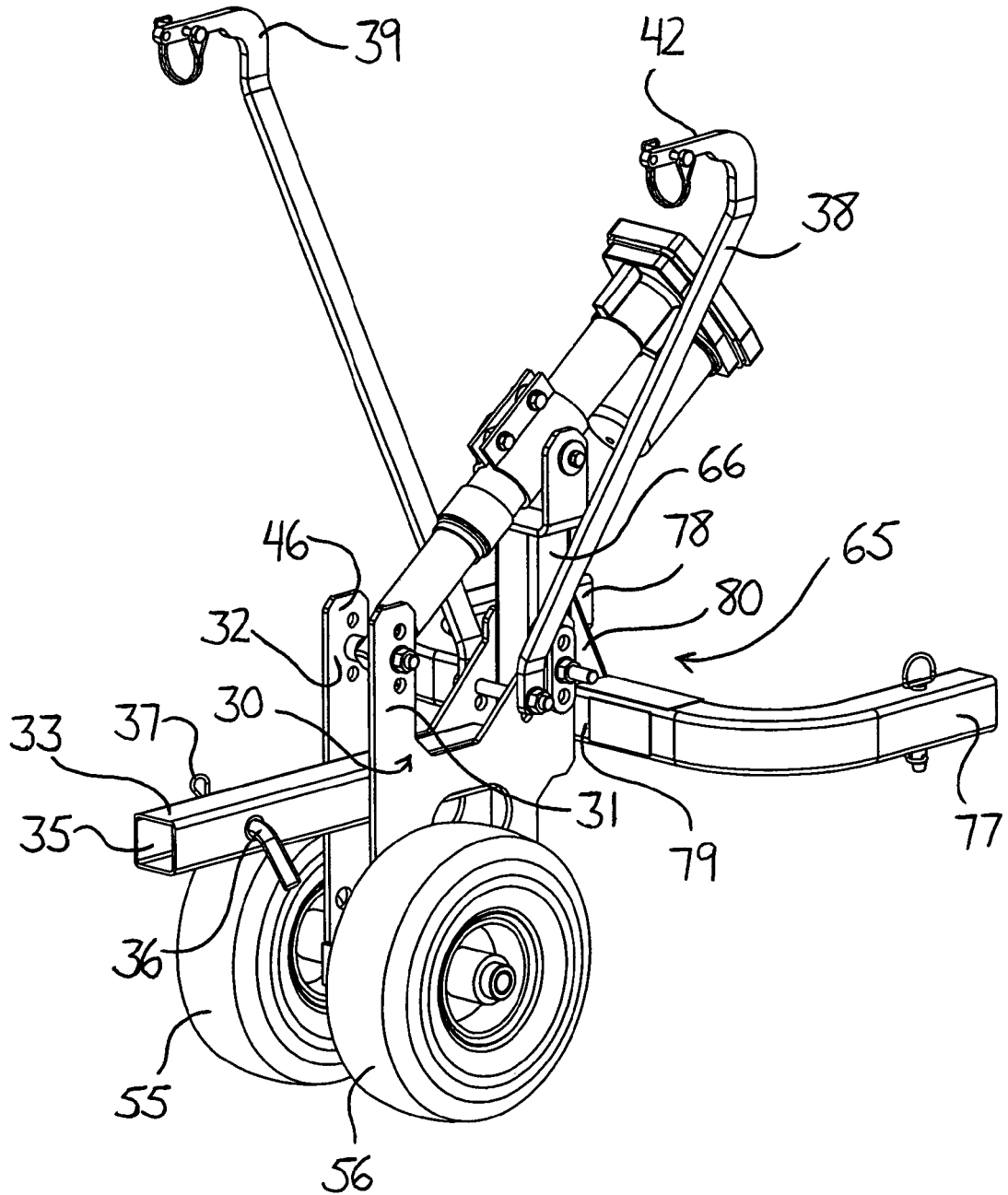
FIG. 3 is an isometric view of the hitch attachment of FIG. 2.

As best shown in FIGS. 2 and 3, the hitch attachment of the present invention comprises a main frame portion generally indicated at 30. The frame 30 is formed of two side plates 31 and 32 which are rigidly attached and stand parallel and vertical in a longitudinal plane of the ATV. Between the plates is mounted a hitch coupling 33. Each of the plates 31 and 32 is mounted on a respective side of the rectangular tubular hitch coupling 33 so as to be supported thereby to form a rigid structure. A hitch coupling 33 has at a forward end a mouth 35 which engages onto the hitch 12 of the ATV as a sliding fit with the hitch coupling 33 being attached to the hitch 12 by a pin 36 which passes through the tubular hitch coupling 33 and through a suitable opening in the hitch 12 and is locked in place by a locking pin 37. Thus the tubular hitch coupling 33 is rigidly attached to the hitch at the rear of the vehicle and extends horizontally rearwardly from the hitch to a position rearward of the vehicle.

The attachment frame 30 is further connected to the vehicle by a pair of brace arms 38 and 39. Each of the brace arms has a lower connecting pin 40 at a lower end which attaches to a suitable location on the attachment frame 30. Each of the brace arms extends from that lower end 41 at the pin 40 upwardly and outwardly to an upper end 42 which attaches to the rack 18 of the ATV.

Also the arms 38 and 39 are located on the frame 30 at a position significantly rearward of the connection point between the hitch coupling 13 and the hitch 12 of the vehicle. Thus any forces on the hitch coupling 33 and the frame 30 to move the rear of the frame 30 from side to side or up and down are resisted by the arms 38 and 39. In view of the outward inclination, sideward pulling on the frame 30 will tend to apply tension in one of the arms to resist that movement. Downward movement of the frame is resisted by tension in both arms. Upward movement is resisted by compression of each of the arms. This arrangement therefore provides a communication of forces from the frame 30 to the ATV which resist movement of the frame relative to the ATV and avoid applying excessive forces merely to the hitch 12 which could be damaged in the event that the forces are large or in the event that cantilever distance of the application of the forces from the rear of the implement is very long.

Each of the plates 31 and 32 of the frame 30 is symmetrical with the other and is located on the respective side of the tubular hitch coupling 33. As shown best in the side view of FIG. 2, the plate 32 includes a centre piece 45 lying along a rear part of the hitch coupling 33 and attached along the side of the hitch coupling. At a forward end of the plate 32 is provided an upwardly extending piece 46 defining a leg which extends upwardly to an upper end 47 above the hitch coupling 33. At the rear of the plate 32 is provided a similar upstanding leg 48 which extends upwardly to a top end 49 spaced upwardly of the hitch coupling 33. Underneath the center portion 45, the plate extends downwardly below the coupling 33 to a bottom edge 50. The downwardly extending portion includes a front edge 51 and a rear edge 52. A hole 53 is formed to reduce weight while avoiding reducing strength. The front edge 51 is along a common line with a front edge 52 of the upwardly extending leg 46. The bottom edge 50 is inclined downwardly and forwardly to a bottom apex 53 at the forward end of the plate.

Across the two plates 31 and 32 is provided an axle 54 which is carried by the plates with the axle providing support for a pair of wheels 55 and 56. Each of the wheels is located on the outside of a respective one of the plates 31 and 32. The wheels have an outer surface arranged for rolling on the ground when required.

The rear edge 52 of the plate is located in front of the leg 49. The rear edge 52 is located behind the wheel so as to provide a portion projecting outwardly from the rear of the wheel and this portion provides a mounting for the pin 40 which is at the lower end 41 of the arm 39. A symmetrical arrangement is located on the opposite side for the arm 38 on the plate 31. The portion of the plate behind the wheel therefore provides a mounting for the lower end of the arm which may include one or more holes for receiving the pin 40 which can be removed to relocate the lower end 41 of the arm. Above this portion containing the hole 57 is located a further hole or more than one hole as indicated at 58. The holes 57 and 58 are generally aligned and located approximately at the rear of the plate so that the lower end of the arm 39 can be moved to different locations depending upon the model of ATV to which the hitch attachment is to be connected. Thus models of a larger size will generally have the arm 39 moved upwardly to a selected one of the upper holes at 58 so as to increase the height of the upper arm 39 above the hitch or connection to a suitable point on the rack.

The arms 38 and 39 are formed as simple flat straps of metal with a forwardly projecting portion 59 at the upper end 42 with a hole 60 which can be locked to a suitable receptacle on the rack of the ATV. Particular models of ATV have a rearwardly extending tube with an open mouth at the rear so that the forward end of the portion 59 can be inserted into the tube and pinned in place. Other designs of ATV may not have a suitable receptacle of this nature and therefore may use an alternative connection at the upper end such as a clamp. The leg 48 of the plate provides a mounting for a rigid connecting member 65 which is arranged for attachment to the implement. Thus the two legs 48 of the plates 31 and 32 defined between them an opening for a post 66 of the rigid connecting member 65. The post fits between the two plates and can pivot on a pin 67 which is connected between the two plates at a selected one of a plurality of holes 68. The plate is reinforced by a backer plate 69 mounted on the outside surface of the plate 32 so as to provide additional resistance to accommodate significant loads from the post 66 through the pin 67 to the plates 31 and 32.

The post 66 carries at its upper end a clevis 70 which provides a swivel support for an electric actuator 71. The electric actuator is carried in a bracket 72 attached to the clevis 70 so that the actuator can swivel about an axis 73 across the clevis 70. The lower end of the actuator 71 is coupled to a pin 74 attached to the leg 46 of the plates 31 and 32. Thus the actuator is located between the clevis 70 and between the plates 31 and 32 at the lower end. The leg 46 has a plurality of mounting holes 75 matching in spacing and location the holes 68 in the leg 48. In this way the user can select the positioning of the pin 67 and the pin 74 in respective ones of the holes 68 and 75 while maintaining the same positional relationship between the post 66 and the lower end of the actuator 71. In otherwords, if the upper most one of the holes 68 and 75 is selected for the pins 71 and 74, the post 66 is moved upwardly but the geometry of the post relative to the actuator is retained unchanged. Thus the user can select the upper most one of the holes 68 and 75, a middle one of the holes or a lower most one of the holes with the arrangement being maintained so that the geometry is unchanged. In this way in the extended position of the actuator shown in FIG. 2, the post 66 is vertical and stands between the legs 48 of the plates 31 and 32.

In a position shown in FIG. 4, the actuator is retracted to a transport position. In this position the post 66 rotates around the pin 67 in a clockwise direction by retraction of the actuator 71. These two positions of the operating position shown in FIG. 2 and the retracted transport position shown in FIG. 4 are the same orientation regardless of the selection of the respective one of the holes 68 and 75 except that the height of the post is adjusted upwardly and downwardly by the selection.

The post 66 carries a mounting bracket 76 in the form of a pair of arms 77 and 78 connected by a center piece 79 forming a generally U-shaped member. The centre cross piece 79 is attached to the post by a generally triangular brace 80 so as to transfer loads between the U-shaped bracket 76 and the post 66. The U-shaped bracket is arranged at right angles to the post 66 so that when the post is vertical as shown in the operating position of FIG. 2 then the U-shaped bracket 76 is in a horizontal plane.

The arms 77 and 78 provide a square tubing portion facing rearwardly. This tubing portion is arranged as a sliding fit to project into respective one of the frame members 23 of the frame of the implement and particularly into a forward end 23A thereof which is provided a flanged or flared mouth 23B. Thus the implement is a sliding fit onto the arms 77 and 78 simply by the user lifting the implement and sliding it toward the arms in a common plane with the arms so that the end of the arms can engage into the flared mouth 23B and slide into the end 23A of the tubes. This of course provides a rigid coupling between the arms and the tube members of the frame which maintains the frame in a common plane with the U-shaped bracket 76.

In the operating position therefore shown in FIG. 2, the arms 77 and 78 are maintained in a horizontal plane which maintains also the frame 22 of the implement in the same horizontal plane. The implement thus projects rearwardly from the ATV and is supported in that common horizontal plane and maintained in that plane so as to apply downward force on the ground engaging elements of the implement. The height of the plane of the implement can be adjusted by selecting the height of the post 66 on the frame 30 by adjusting the position of the pin 30. This can be used to accommodate different height of implement or different height of ATV as required. However the intention is that the implement will project directly outwardly from the rear of the ATV in the horizontal plane defined by the hitch 12. Of course the implement will tend to pivot around the axle of the rear wheels in the event that the ATV pivots due to a change in ground height. However the implement projects only a relatively short distance of the rear of the ATV so that this movement is not significant in operation of the implement on the ground.

The adjustment of the height of the implement can accommodate different size of ground engaging elements so as to provide an effective action of the elements on the ground regardless of the slight changes in angle of the implement around the axis of the rear wheel of the ATV.

The simple rigid connection of the implement by the two frame members to the two arms without any additional connection provides a quick coupling arrangement while providing a significant transfer of force from the hitch attachment to the implement. Thus the weight of the ATV can be used to apply downward force on the implement with that weight being transferred through the hitch coupling 33 and the arms 38 and 39. Side to side movement of the implement is also restricted by the simple connection of the two arms to the implement frame members with the side to side forces being transferred through the bracket 76 to the post 66 which is prevented from twisting by the coupling to the two plates 31 and 32. The brace or gusset 80 transfers loading from the bracket 76 to the post particularly upward and downward loading which is the primary force direction for the operation of the implement.

The ground wheels 55 and 56 are located as shown in FIG. 1 so that in the operating position they are raised above the ground that is above the bottom edge of the wheels 13. In the operating position shown therefore in FIG. 1 when the primary action is for weight to be applied from the ATV to the implement, the suspension is normally slightly raised so that the wheels 55 and 56 are raised from the ground. However when the implement is moved to the raised transport position shown in FIG. 4 by movement of the actuator 71, weight of the implement is transferred to the rear of the ATV through the hitch attachment and this will therefore tend to lower the suspension 15 causing the ATV to squat due to the additional weight. Excess squatting movement is prevented by engagement of the ground wheels 55 and 56 with the ground so as to transfer some load to the ground from the weight of the implement and the hitch attachment through the wheels and thus limit the amount of weight applied at the rear of the ATV. Thus there is no connection between the hitch attachment and the suspension 15 or the axle 14 which in any way limits the normal suspension movement of the ATV during operation or in transport. However excess weight of relatively heavy implements which could overload the rear of the ATV and bottom out the suspension is resisted by the presence of the wheels 55 and 56.

The hitch attachment provides a mounting system which can be attached to most current models of ATV including those manufactured by Honda, Yamaha, Polaris, Artic Cat, Kawasaki and Bombardier of the type designed for utilitarian function as opposed to the sporting type of ATV.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A hitch attachment for connecting an implement to an ATV wherein the ATV comprises a frame mounted on ground wheels, a drive system for driving the ATV, a rear hitch attached to the frame and a rear rack attached to the frame, the hitch attachment comprising:

an attachment frame;
a hitch coupling mounted on the attachment frame;
the hitch coupling being arranged such that when connected to the rear hitch the hitch coupling is rigid relative to the rear hitch;
the attachment frame being mounted rigid relative to the hitch coupling such that the attachment frame is carried rearwardly of the rear hitch at a position which is held rigid relative to the rear hitch;
two brace arms each connected to the attachment frame on a respective side thereof and each arranged to extend upwardly from the attachment frame to a respective connection location on the rear rack and each including a coupling member for connection at the connection location;
a rigid connecting member having couplings thereon for rigid connection to a forward end of an implement such that, when the implement is connected to the rigid connecting member, the rigid connecting member remains at a fixed orientation to the implement;
a pivot mounting for mounting the rigid connecting member on the attachment frame for pivotal movement about a horizontal pivot axis transverse to the rear hitch;
and an actuator for effecting pivotal movement of the rigid connecting member about the pivot axis between an operating position in which the rigid connecting member holds the implement in fixed operating position extending rearwardly from the rear hitch and a transport position in which the rigid connecting member is rotated around the pivot axis to rotate the implement around the pivot axis to a raised transport position;
wherein the attachment frame includes first adjustment mountings for mounting the pivot mounting of the rigid implement mounting frame by which the height of the pivot axis on the attachment frame can be adjusted and second adjustment mountings for mounting the actuator by which the height of the actuator and the height of the pivot axis on the attachment frame can be adjusted, with the first and second mountings arranged for common height adjustment of the pivot axis and actuator such that, at each position of adjustment, the angle of the rigid implement mounting frame about the pivot axis in the operating position remains the same.

2. A combination comprising:
an ATV comprising:
ground wheels including two rear ground wheels
a frame mounted on the ground wheels,
a drive system for driving the ATV,
a rear hitch attached to the frame;
a rear rack attached to the frame; and
a suspension system allowing up and down movement of at least the rear wheels relative to the frame and therefore relative to the rear hitch and the rack attached to the frame;
and a hitch attachment for connecting an implement to the ATV comprising:
an attachment frame;
a hitch bar mounted on the attachment frame for engaging the rear hitch of the ATV;
the hitch bar being arranged such that when connected to the rear hitch of the ATV the hitch bar is rigid relative to the rear hitch;
two brace arms each connected to the attachment frame and each arranged to extend upwardly from the attachment frame to a respective connection location on the rear rack on a respective side thereof and each including a coupling member for connection at the connection location;
the attachment frame being connected to the hitch bar and to the brace arms such that the attachment frame is carried rearwardly of the rear hitch at a height which is held fixed relative to the frame of the ATV by the hitch bar and the brace arms so as to transfer weight between the frame of the ATV and the attachment frame;
a rigid implement mounting frame for connection to a forward end of an implement;
the rigid implement mounting member defining a pair of arms extending rearwardly and including couplings at a rear end thereof which are arranged to connect rigidly to the implement such that, when the implement is connected to the arms of the rigid implement mounting member, the implement remains at a fixed orientation to the rigid implement mounting member;
the rigid implement mounting member having a forward end thereof rigidly attached to the attachment frame at a position thereon by an attachment coupling;
the attachment coupling being arranged to so as to transfer weight between the frame of the ATV and the implement mounting member through the attachment frame;
the attachment coupling being arranged such that the height of the implement mounting member is maintained fixed relative to the frame of the ATV by the position of the implement mounting member on the attachment frame independently of the up and down movement of the rear wheels on the suspension relative to the frame;
the attachment coupling including a pivot mounting for pivotal movement of the implement mounting member relative to the attachment frame about a horizontal pivot axis transverse to the rear hitch between an operating position in which the implement mounting member holds the implement in fixed operating position extending rearwardly from the rear hitch and a transport position in which the implement mounting member is rotated around the pivot axis to rotate the implement around the pivot axis to a raised transport position;

wherein the attachment frame includes first adjustment mountings for mounting the pivot mounting of the rigid implement mounting frame by which the height of the pivot axis on the attachment frame can be adjusted and second adjustment mountings for mounting the actuator by which the height of the actuator and the height of the pivot axis on the attachment frame can be adjusted, with the first and second mountings arranged for common height adjustment of the pivot axis and actuator such that, at each position of adjustment, the angle of the rigid implement mounting frame about the pivot axis in the operating position remains the same.

3. The combination according to claim 2 wherein the brace arms are mounted on the attachment frame so as to be inclined upwardly and outwardly toward the rear rack to assist in preventing side to side movement of the attachment frame on the rear hitch.

4. The combination according to claim 2 wherein the attachment frame includes a plurality of different connection points thereon for coupling lower ends of each of the brace arms to adjust for different ATV types.

5. The combination according to claim 2 wherein the rigid implement mounting frame includes a pair of horizontally spaced, rearwardly extending connecting arms, each arranged for rigid connection to a forward end of a respective frame member of an implement so as to hold the frame members of the implement in a common plane with the arms.

6. The combination according to claim 2 wherein there is provided an actuator for effecting pivotal movement of the rigid connecting member about the pivot axis.

7. The combination according to claim 2 wherein the rigid connecting member is connected to the implement only by the two connecting arms.

8. The combination according to claim 2 wherein the angle is arranged such that the angle of the rigid implement mounting frame remains horizontal to retain a frame of the implement horizontal.

9. The combination according to claim 2 wherein there is provided at least one ground wheel carried on the attachment frame which is arranged to be spaced from the ground in the operating position and arranged such that it can engage the ground to limit squatting of the rear hitch of the ATV caused by movement of the suspension relative to the frame of the ATV when the implement is moved to transport position.

* * * * *